(12) United States Patent
Demura et al.

(10) Patent No.: US 9,055,138 B2
(45) Date of Patent: Jun. 9, 2015

(54) INFORMATION PROCESSING DEVICE, INFORMATION PROCESSING METHOD, AND COMPUTER READABLE MEDIUM

(75) Inventors: Tetsuya Demura, Ishikawa (JP);
Toshitaka Kawahigashi, Ishikawa (JP);
Naoki Saitou, Ishikawa (JP); Masaki Matsuda, Ishikawa (JP); Tomoharu Nakamura, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 315 days.

(21) Appl. No.: 13/596,872

(22) Filed: Aug. 28, 2012

(65) Prior Publication Data

US 2013/0070639 A1    Mar. 21, 2013

(30) Foreign Application Priority Data

Sep. 20, 2011   (JP) ................. 2011-204111

(51) Int. Cl.
*H04L 29/12* (2006.01)

(52) U.S. Cl.
CPC .......... *H04L 61/6086* (2013.01); *H04L 61/103* (2013.01); *H04L 61/1511* (2013.01)

(58) Field of Classification Search
None
See application file for complete search history.

(56) References Cited

U.S. PATENT DOCUMENTS

| 6,574,664 | B1 * | 6/2003 | Liu et al. ................. 709/224 |
| 6,925,087 | B2 * | 8/2005 | Inoue ...................... 370/401 |
| 8,699,378 | B2 * | 4/2014 | Kormann et al. ........... 370/254 |
| 2004/0225750 | A1 * | 11/2004 | Lim et al. ................ 709/245 |
| 2007/0136601 | A1 * | 6/2007 | Kwon et al. .............. 713/182 |
| 2007/0208935 | A1 * | 9/2007 | Choi et al. ............... 713/161 |
| 2008/0008183 | A1 * | 1/2008 | Takagaki et al. .......... 370/392 |
| 2011/0075590 | A1 * | 3/2011 | Kormann et al. .......... 370/254 |
| 2011/0161665 | A1 * | 6/2011 | Perez ...................... 713/161 |
| 2012/0131211 | A1 * | 5/2012 | Schemitsch .............. 709/228 |
| 2013/0294451 | A1 * | 11/2013 | Li et al. .................. 370/392 |

FOREIGN PATENT DOCUMENTS

| JP | 2008-022461 | 1/2008 |
| JP | 2010-062757 A | 3/2010 |
| JP | 2011-109591 A | 6/2011 |

OTHER PUBLICATIONS

Notification of Reasons for Refusal, dated May 2, 2014, corresponding to Japanese Patent Application No. JP-2011-204111. [English Translation].

* cited by examiner

*Primary Examiner* — Hicham Foud
(74) *Attorney, Agent, or Firm* — Hogan Lovells US LLP

(57) ABSTRACT

The invention relates to a node detection apparatus and a method utilizing the same. The node detection apparatus may include a first and second acquisition section that acquires identification information peculiar to a communication device in accordance with a first or second communication protocol. The node detection apparatus may include an identification section that identifies the communication device that complies with both of the first communication protocol and the second communication protocol based on the identification information acquired by the first acquisition section and the identification information acquired by the second acquisition section.

2 Claims, 19 Drawing Sheets

PROTOCOL DECISION PROCESSING (S1) ON DETECTED NODE

NODE DETECTION PROCESSING (S10)

Fig. 11(A)

- (A) INFORMATION REGISTERED IN NODE REGISTRATION PORTION 524

| IP ADDRESS | MAC ADDRESS | ATTRIBUTE |
|---|---|---|
| 192.0.2.2 | 00-0b-5d-18-87-00 | IPv4 |
| 192.0.2.3 | 00-0b-5d-18-87-11 | IPv4 |
| 192.0.2.4 | 00-0b-5d-18-87-22 | IPv4 |

Fig. 11(B)

- (B) INFORMATION REGISTERED IN NODE REGISTRATION PORTION 544

| IP ADDRESS | MAC ADDRESS | ATTRIBUTE |
|---|---|---|
| 2001:db8::200 | 00-0b-5d-18-87-00 | IPv6 |
| 2001:db8::201 | 00-0b-5d-18-87-01 | IPv6 |
| 2001:db8::202 | 00-0b-5d-18-87-02 | IPv6 |
| 2001:db8::300 | 00-0b-5d-18-88-22 | IPv6 |

Fig. 11(C)

- (C) INFORMATION REGISTERED IN NODE REGISTRATION PORTION 564

| IPv4 ADDRESS | IPv6 ADDRESS | MAC ADDRESS | ATTRIBUTE |
|---|---|---|---|
| 192.0.2.2 | 2001:db8::200 | 00-0b-5d-18-87-00 | Dual |
| 192.0.2.3 | | 00-0b-5d-18-87-11 | IPv4 |
| 192.0.2.4 | | 00-0b-5d-18-87-22 | IPv4 |
| | 2001:db8::201 | 00-0b-5d-18-87-01 | IPv6 |
| | 2001:db8::202 | 00-0b-5d-18-87-02 | IPv6 |
| | 2001:db8::300 | 00-0b-5d-18-88-22 | IPv6 |

Fig. 12(A)

- (A) QUANTITY DISPLAY

| ATTRIBUTE | QUANTITY |
|-----------|----------|
| IPv4      | 5 PIECES |
| Dual      | 1 PIECE  |
| IPv6      | 2 PIECES |

Fig. 12(B)

・(B) QUANTITY DISPLAY FOR EACH SUBNET

```
192.0.2.0/24

IPv4      2PIECES

Dual      1PIECE 198.51.100.0/24

IPv4      2PIECES

Dual      1PIECE

2001:db8::0/32

IPv6      2PIECES

Dual      2PIECES
```

Fig. 12(C)

- (C) RECOMMENDATION DISPLAY

```
192.0.2.0/24

IPv4   2PIECES    ★ SUBJECT TO DECISION
                    AS TO WHETHER SHIFT IS
                    TO BE MADE TO (IPv6)

Dual   1PIECE
```

Fig. 13(A)

・(A)TABLE DISPLAY

| Ipv4 ADDRESS | IPv6 ADDRESS | MAC ADDRESS | ATTRIBUTE | SHIFT RECOMMENDATION |
|---|---|---|---|---|
| 192.0.2.100 | - | 00-1d-5d-18-87-00 | IPv4 | |
| 192.0.2.101 | 2001:db8::200 | 00-19-5d-18-87-00 | Dual | |
| - | 2001:db8::201 | 00-19-5d-18-87-11 | IPv6 | |
| - | 2001:db8::202 | 00-19-5d-18-87-22 | IPv6 | |
| - | 2001:db8::203 | 00-19-5d-18-87-33 | IPv6 | |
| 192.0.2.102 | - | 00-1d-5d-18-87-11 | IPv4 | |
| 192.0.2.103 | - | 00-1d-5d-18-87-22 | IPv4 | |
| 192.0.2.150 | 2001:db8::204 | 00-19-5d-18-87-44 | Dual | |
| 192.0.2.151 | 2001:db8::205 | 00-19-5d-18-87-55 | Dual | |
| 192.0.2.152 | 2001:db8::206 | 00-19-5d-18-87-66 | Dual | |
| 198.51.100.2 | 2001:db8:1::1 | 00-19-5d-18-87-77 | Dual | |
| 198.51.100.3 | 2001:db8:1::2 | 00-19-5d-18-87-88 | Dual | |
| 198.51.100.4 | 2001:db8:1::3 | 00-19-5d-18-87-99 | Dual | |
| 198.51.100.5 | 2001:db8:1::4 | 00-19-5d-18-87-12 | Dual | |
| 198.51.100.6 | - | 00-19-5d-18-87-13 | IPv4 | ● |

・(C)DETAIL CONFIRMATION DISPLAY

PROPERTY CONFIRMATION
(CLICK)

```
PROPERTIES
HOST NAME:node1
IPv4ADDRESS:192.0.2.2
IPv6ADDRESS:2001:db8::2
MAC ADDRESS:00-1d-5d-18-87-01
ATTRIBUTE:Dual
```

INFORMATION PROCESSING DEVICE, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-204111 filed Sep. 20, 2011.

FIELD

The present invention relates to a node detection apparatus, a node detection method, and a computer readable medium.

BACKGROUND

JP2008-22461 disclosed a communication terminal device having communication functions to which both of IPv4 and IPv6 can be applied, in which the usable attributes of IPv4 and IPv6 can be registered for each log-in user.

SUMMARY OF THE INVENTION

According to an aspect of the invention, there is provided a node detection apparatus including: a first acquisition section that acquires identification information peculiar to a communication device in accordance with a first communication protocol; a second acquisition section that acquires the identification information peculiar to the communication device in accordance with a second communication protocol; and an identification section that identifies the communication device that complies with both of the first communication protocol and the second communication protocol based on the identification information acquired by the first acquisition section and the identification information acquired by the second acquisition section.

According to another aspect of the invention, there is provided a node detection method including a first acquisition step of acquiring identification information peculiar to a communication device in accordance with a first communication protocol; a second acquisition step of acquiring the identification information peculiar to the communication device in accordance with a second communication protocol; and an identification step of identifying the communication device that complies with both of the first communication protocol and the second communication protocol based on the identification information acquired in the first acquisition step and the identification information acquired in the second acquisition step.

According to another aspect of the invention, there is provided a non-transitory computer-readable medium storing thereon a computer program that causes a computer to perform the steps of: a first acquisition step of acquiring identification information peculiar to a communication device in accordance with a first communication protocol; a second acquisition step of acquiring the identification information peculiar to the communication device in accordance with a second communication protocol; and an identification step of identifying the communication device that complies with both of the first communication protocol and the second communication protocol based on the identification information acquired in the first acquisition step and the identification information acquired in the second acquisition step.

BRIEF DESCRIPTION OF THE DRAWINGS

Exemplary embodiments of the present invention will be described in detail based on the following figures, wherein:

FIGS. 11(A) to 11(C) are examples of displaying information to be registered by the protocol decision processing (S20);

FIGS. 12(A) to 12(C) are examples of displaying node information identified by the protocol decision processing (S20); and FIGS. 13(A) to 13(C) are examples of patterns in which node information is displayed.

DESCRIPTION OF EMBODIMENTS

The following will describe an embodiment of the present invention with reference to the drawings.

Figure 1:
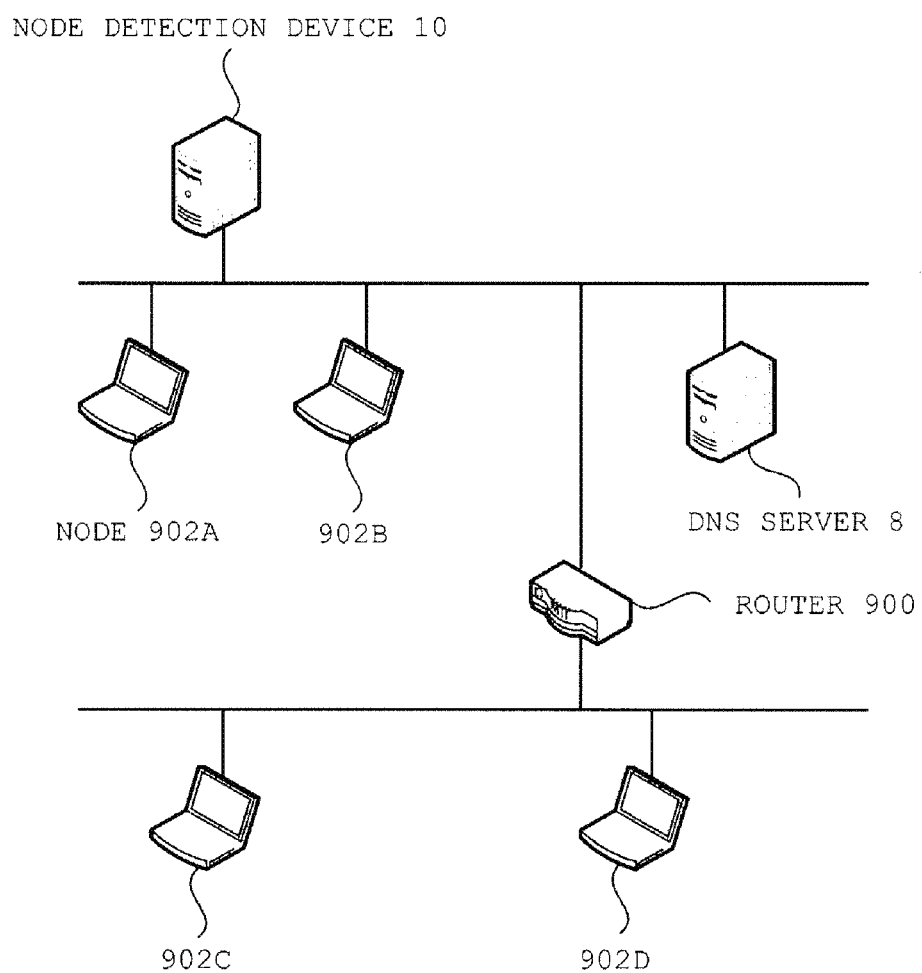
FIG. 1 is an explanatory diagram of an outline of a node detection system 1.

FIG. 1 is an explanatory diagram of the outline of a node detection system 1.

As exemplified in FIG. 1, the node detection system 1 of the present embodiment has a node detection device 10 and a DNS server 8. Nodes 902A through 902D are to be detected and scattered to a plurality of segments connected via a router 900.

The node detection device 10 is a server device in which, for example, a later-described protocol decision program 5 is installed. The node detection device 10 detects nodes present in a network, identifies them, and displays them. The node here refers to an element of the network and may include communication devices such as a computer terminal, a router, and a hub.

Although the present example will be described using a notebook computer terminal 902 as a node, the present invention is not limited to it; for example, the router 900 could also be a node.

The DNS server 8 is a server device of a domain name system and manages a table in which Internet protocol addresses (IP addresses) and domain names or host names correspond to each other. The DNS server 8 of the present example stores at least a AAAA record containing the IP address of IPv6 and an A record containing the IP address of IPv4 and manages the IP address and the host name of the node 902.

Although the following description is based on the assumption that IPv6 nodes and IPv4 nodes are mixed in the network, the present invention is not limited to it; even when the network includes only the IPv6 nodes or IPv4 nodes, it is operable similarly.

Figure 2:
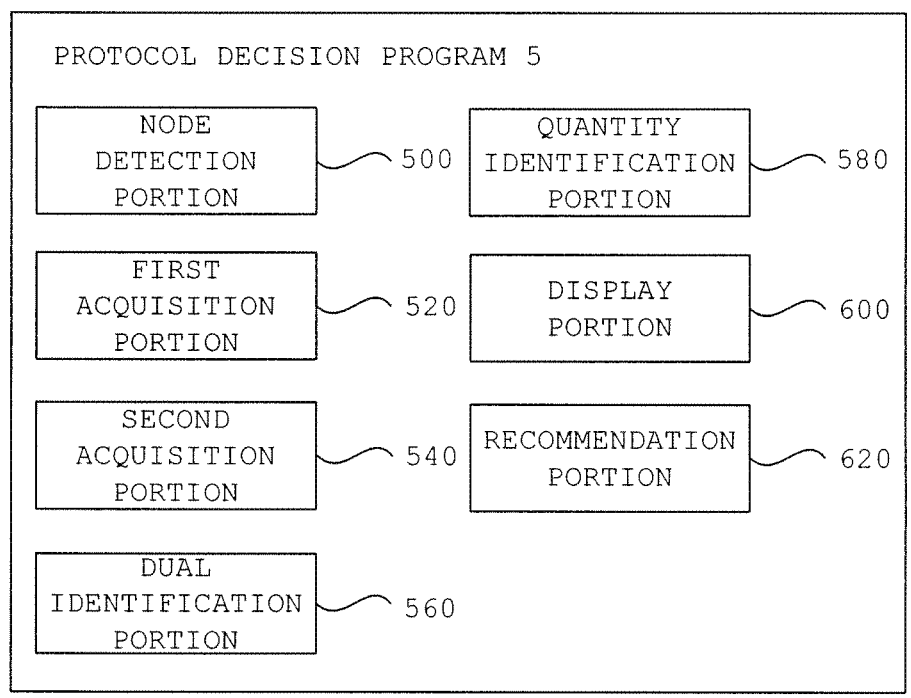
FIG. 2 is an explanatory diagram of a configuration of a protocol decision program 5 of the node detection system 1.

FIG. 2 is an explanatory diagram of a configuration of the protocol decision program 5.

As exemplified in FIG. 2, the protocol decision program 5 has a node detection portion 500, a first acquisition portion 520, a second acquisition portion 540, a dual identification portion 560, a quantity identification portion 580, a display portion 600, and a recommendation portion 620.

Figure 3:
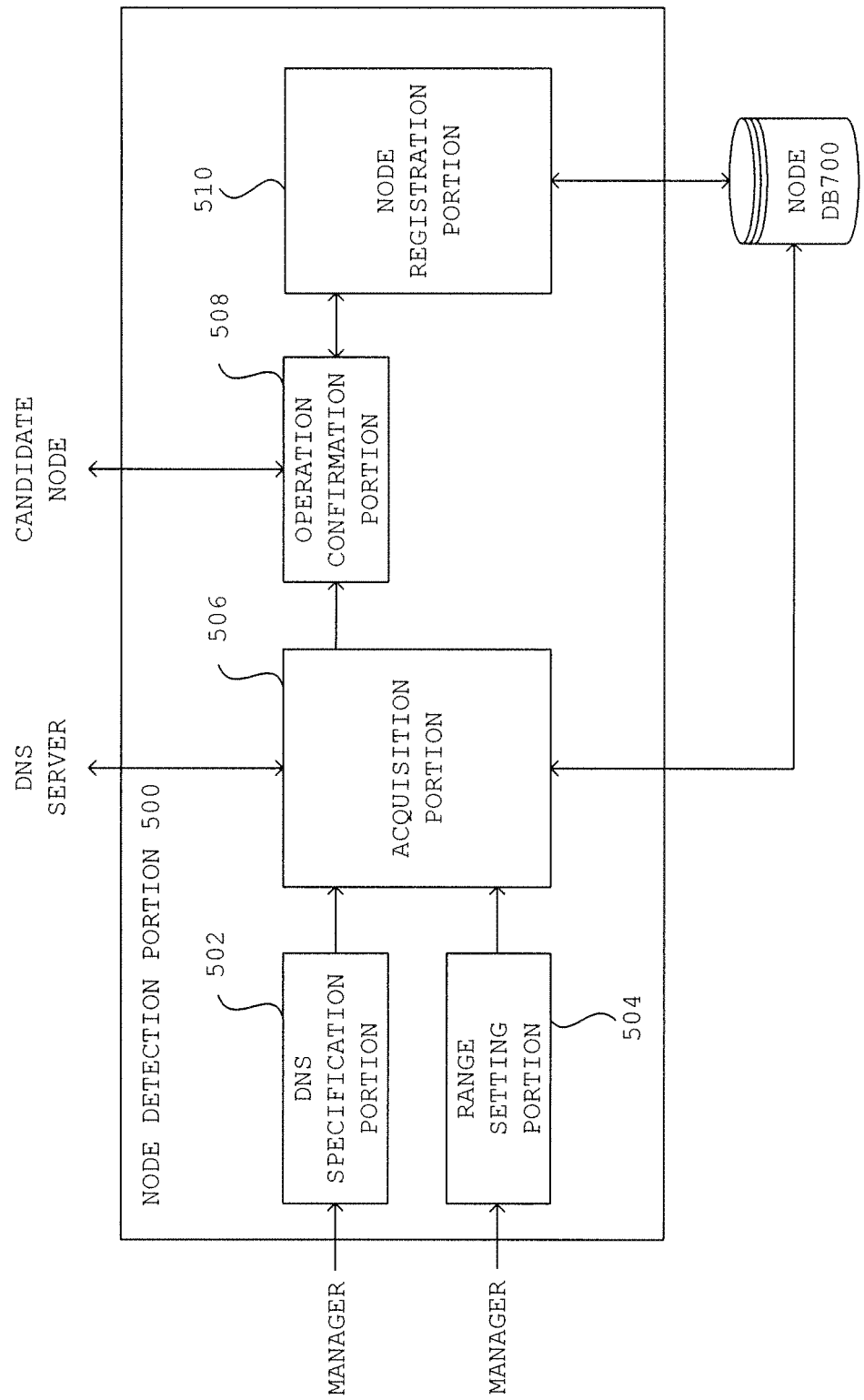
FIG. 3 is an explanatory diagram of a configuration of a node detection portion 500.

FIG. 3 is an explanatory diagram of a configuration of the node detection portion 500.

As exemplified in FIG. 3, the node detection portion 500 includes a DNS specification portion 502, a range setting portion 504, an acquisition portion 506, an operation confirmation portion 508, and a node registration portion 510. The DNS specification portion 502 receives specification of the DNS server in response to operations of a manager (user). In response to operations of the manager, the range setting portion 504 sets the range of addresses subject to node detection. For example, when one IP address is directly specified by the manager, the range setting portion 504 sets only the specified IP address in the range; when a segment (LAN, etc.) is specified by the manager, it sets an IP address group that corresponds to the specified segment; when a starting IP address and an ending IP address are specified by the manager, it sets a range from the starting IP address to the ending IP address; when a host name is specified by the manager, it sets an IP address that corresponds to the specified host name; and when an IP address to be excluded is specified by the manager, it sets an IP address group from which the specified IP address is excluded.

The acquisition portion 506 acquires address information managed by the DNS server 8 and outputs the acquired address information to the operation confirmation portion 508. For example, the acquisition portion 506 accesses the DNS server 8 specified by the DNS specification portion 502 to acquire the AAAA records or the A records, extracts host names and an IP address in a range specified by the range setting portion 504 from the acquired AAAA records or the A records, and outputs the extracted IP addresses and host names as candidate nodes to the operation confirmation portion 508.

Based on the address information acquired by the acquisition portion 506, the operation confirmation portion 508 confirms the operation of a node (communication device) that corresponds to this address information. For example, the operation confirmation portion 508 confirms the operation of the node corresponding to the IP address input from the acquisition portion 506 and outputs results of the confirmation to the node registration portion 510 in accordance with an ICMP.

The node registration portion 510 registers information (address information, host name, etc.) of a node whose operation has been confirmed by the operation confirmation portion 508, in a node DB700.

Figure 4:
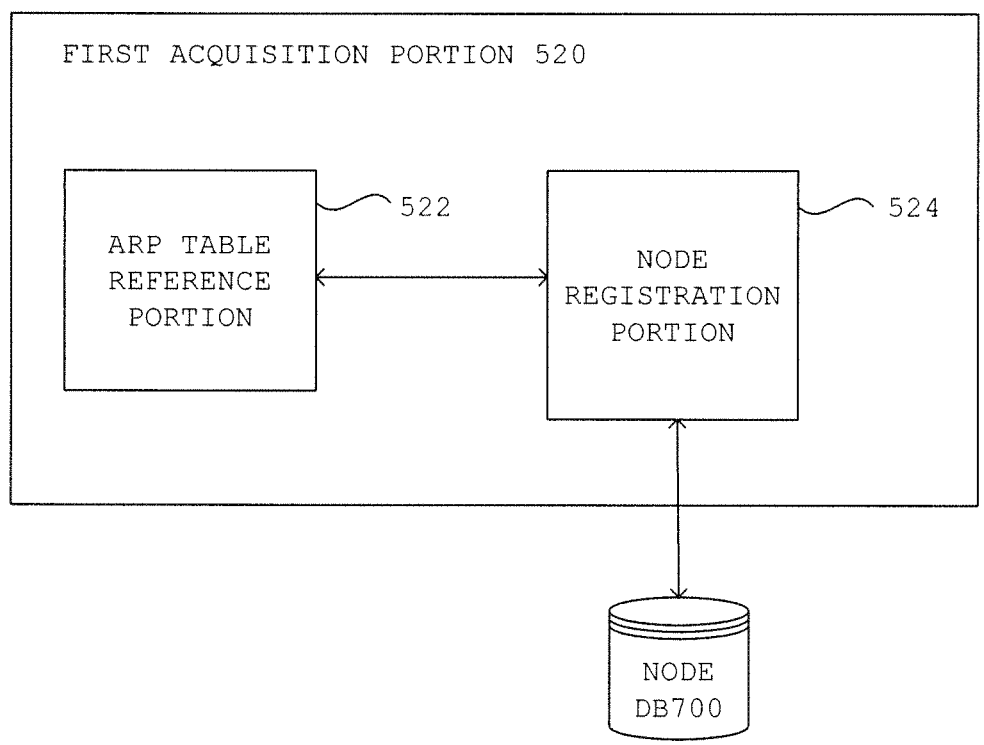
FIG. 4 is an explanatory diagram of a configuration of a first acquisition portion 520.

The first acquisition portion 520 acquires identification information peculiar to a communication device in accordance with a first communication protocol. Specifically, the first acquisition portion 520 includes an ARP table reference portion 522 and a node registration portion 524 as exemplified in FIG. 4. In the first acquisition portion 520, the ARP table reference portion 522 acquires information (MAC address) of an IPv4-compliant node from an ARP table. In addition to the IP address and the MAC address acquired by the ARP table reference portion 522, the node registration portion 524 registers an attribute (IPv4) in the node DB700. The attribute here refers to the accommodating communication protocol, which is "IPv4", "IPv6", or "IPv4 and IPv6" (dual stack) in the present example.

Figure 5:
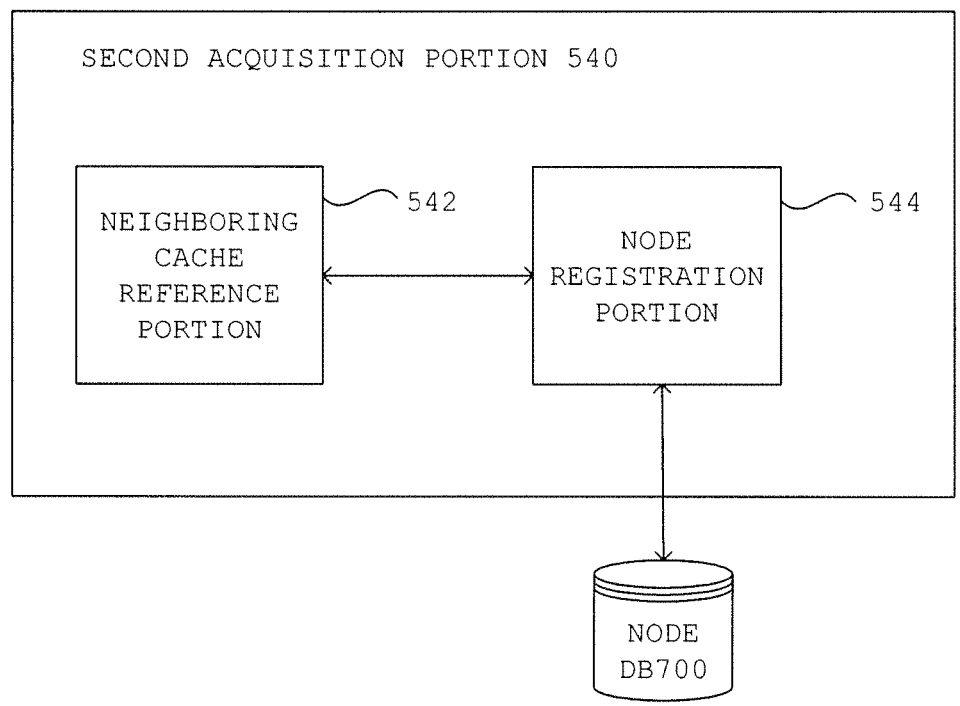
FIG. 5 is an explanatory diagram of a configuration of a second acquisition portion 540.

The second acquisition portion 540 acquires identification information peculiar to a communication device in accordance with a second communication protocol. Specifically, the second acquisition portion 540 includes a neighboring cache reference portion 542 and a node registration portion 544 as exemplified in FIG. 5. In the second acquisition portion, the neighboring cache reference portion 542 acquires information (MAC address) of an IPv6-compliant node from a neighboring cache. In addition to the IP address and the MAC address acquired by the neighboring cache reference portion 542, the node registration portion 544 registers an attribute (IPv6) in the node DB700.

Figure 6:
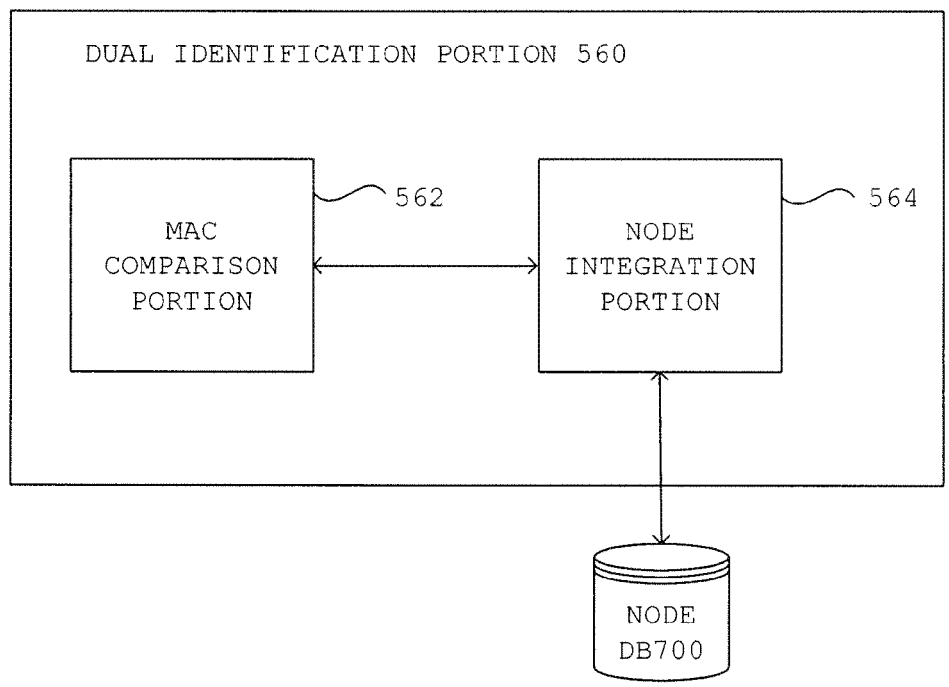
FIG. 6 is an explanatory diagram of a configuration of a dual identification portion 560.

The dual identification portion 560 identifies a communication device that complies with both of the first communication protocol and the second communication protocol, based on the identification information acquired by the first acquisition portion 520 and that acquired by the second acquisition portion 540. Specifically, the dual identification portion 560 includes an MAC comparison portion 562 and a node integration portion 564 as exemplified in FIG. 6. The MAC comparison portion 562 compares the MAC address of an IPv4-compliant node identified by the first acquisition portion 520 and that of an IPv6-compliant node identified by the second acquisition portion 540 to each other. When there is any overlapping MAC address, the node integration portion 564 integrates overlapping node information of the MAC address. Specifically, the node integration portion 564 updates the node DB700 by using an attribute of the node information to be integrated, as a dual stack node. The dual stack node here refers to a node that complies with both of the IPv4 protocol and the IPv6 protocol.

Based on the identification information acquired by the first acquisition portion 520 and that acquired by the second acquisition portion 540, the quantity identification portion 580 identifies the number of communication devices which comply with both of the first and second communication protocols, the number of communication devices which comply with the first communication protocol but do not comply with the second communication protocol, and the number of communication devices which comply with the second communication protocol but do not comply with the first communication protocol. Specifically, the quantity identification portion 580 identifies the number of nodes which comply with only the IPv4 protocol, the number of nodes which comply with only the IPv6 protocol, and the number of dual stack nodes which comply with both of IPv4 and IPv6.

The display portion 600 displays the number of communication devices identified in the quantity identification portion 580, for each subnet. Specifically, the display portion 600 acquires information of the number of nodes which comply with the IPv4 protocol, the number of nodes which comply with the IPv6 protocol, and the number of dual stack nodes which comply with both of IPv4 and IPv6 from the node DB700 and displays them for each subnet.

Figure 7:
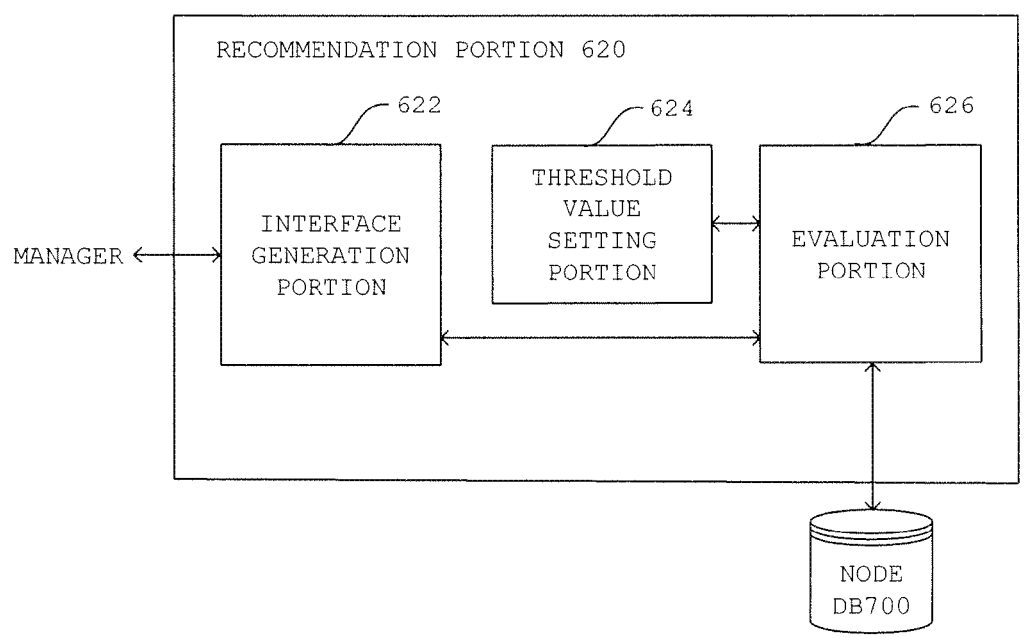
FIG. 7 is an explanatory diagram of a configuration of a recommendation portion 620.

Based on the subnet-specific number of communication devices identified by the quantity identification portion 580, the recommendation portion 620 recommends to cause the communication devices which comply with the first communication protocol but do not comply with the second communication protocol (which comply with only IPv4) to comply with the second communication protocol (IPv6). Specifically, as exemplified in FIG. 7, the recommendation portion 620 includes an interface generation portion 622, a threshold value setting portion 624, and an evaluation portion 626. In response to operations of the manager, the threshold value setting portion 624 hands over a threshold value of the node which complies with the IPv4 protocol to the evaluation portion 626. In accordance with the threshold value, the evaluation portion 626 acquires information of the node recommended to make a shift to IPv6 from the node DB700. For example, when the number of the IPv4 nodes present in a subnet is one or less, the evaluation portion 626 recommends it making a shift to IPv6; and when the number of the IPv4 nodes present in the subnet is at least two, the evaluation portion 626 does not recommend them making a shift to IPv6. The threshold value is not limited to the quantity but may be the percentage of the IPv4 nodes. The interface generation portion 622 displays the acquired information.

Figure 8:
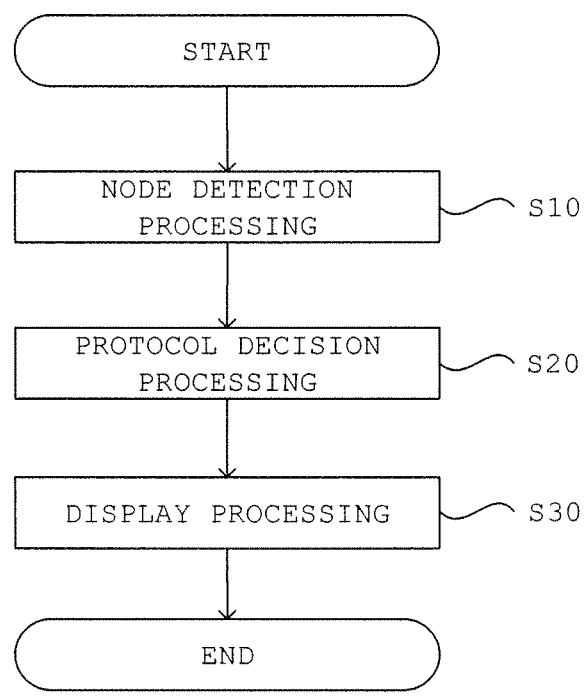
FIG. 8 is an explanatory flowchart of protocol decision processing (S1) on a detected node.

FIG. 8 is an explanatory flowchart of protocol decision processing (S1) on a detected node.

As exemplified in FIG. 8, in step 10 (S10), the node detection portion 500 performs node detection processing.

In step 20 (S20), the protocol decision program 5 performs protocol decision processing on a group of nodes detected by the node detection portion 500.

In step 30 (S30), the display portion 600 displays results of the protocol decision processing.

Figure 9:
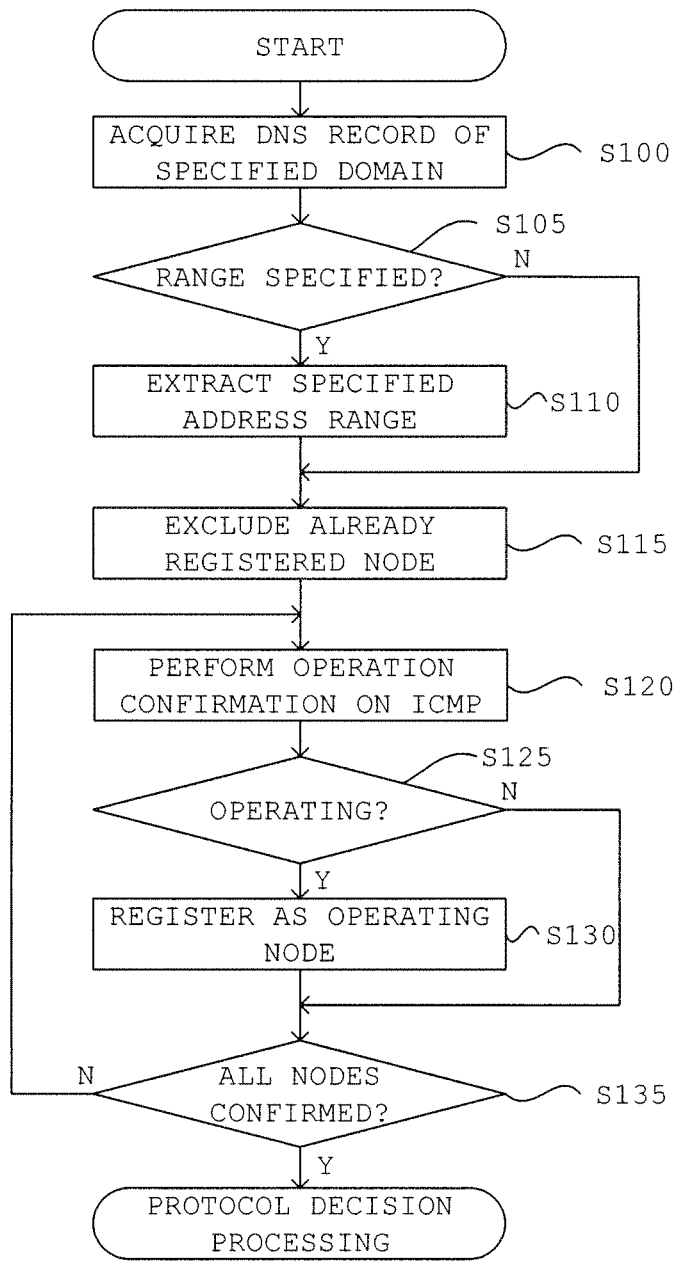
FIG. 9 is an explanatory flowchart of node detection processing (S10)

FIG. 9 is an explanatory flowchart of node detection processing (S10).

As exemplified in FIG. 9, in step 100 (S100), the DNS specification portion 502 displays a list of domains to prompt the manager to specify the domain (that is, a DNS server which manages the domain). When the manager selects any domain, the DNS specification portion 502 notifies the acquisition portion 506 of the DNS server that corresponds to the selected domain.

The acquisition portion 506 queries the DNS server posted from the DNS specification portion 502 about the AAAA records and the A records, to acquire IP addresses and host names. Specifically, the acquisition portion 506 executes the nslookup command in which a record type is specified, on the posted DNS server 8. Accordingly, DNS records are acquired by the acquisition portion 506. The DNS records could contain the IPv6 AAAA records and the IPv4 A records.

In step 105 (S105), the node detection processing (S10) decides whether an IP address range is set by the range setting portion 504, and when the range is set, it makes a shift to S110 processing and, when no range is set, makes a shift to S115 processing.

In step 110 (S110), the acquisition portion 506 extracts the IP addresses present in the set range and the corresponding host names from the acquired IP addresses and host names.

In step 115 (S115), the acquisition portion 506 excludes the IP addresses and the host names registered in the node DB700 from the extracted IP addresses and host names and outputs the remaining IP addresses and host names to the operation confirmation portion 508.

In step S120 (S120), the operation confirmation portion 508 confirms operations of nodes in sequence based on the IP addresses and the host names input from the acquisition portion 506. Specifically, the operation confirmation portion 508 transmits ECHOREQUEST which complies with ICMPv4 or ICMPv6 to the nodes having the input IP addresses.

In step 125 (S125), when the operation of any node is confirmed by the operation confirmation portion 508, the node detection processing (S10) decides that the node exists and makes a shift to S130 processing, and when the operation of the node is not confirmed, it decides that the node does not exist and makes a shift to S135 processing. Specifically, the operation confirmation portion 508 confirms the operation of the nodes in sequence based on the IP addresses and the host names input from the acquisition portion 506. Specifically, when ECHOREPLY is returned in response to the transmitted ECHOREQUEST, the operation confirmation portion 508 notifies the node registration portion 510 of the relevant node as an operating node and, when ECHOREPLY is not returned, decides that it does not exist.

In step 130 (S130), the node registration portion 510 registers the IP addresses and the host names of the node posted as the operating node from the operation confirmation portion 508, in the node DB700.

In step 135 (S135), the node detection processing (S10) decides whether operation confirmation is performed on all of the nodes extracted by the acquisition portion 506, and when any nodes are yet to be confirmed on operations, returns to the S120 processing to perform operation confirmation on the next node until all of the nodes are confirmed on operation, whereupon it makes a shift to the protocol decision processing (S20).

Figure 10:
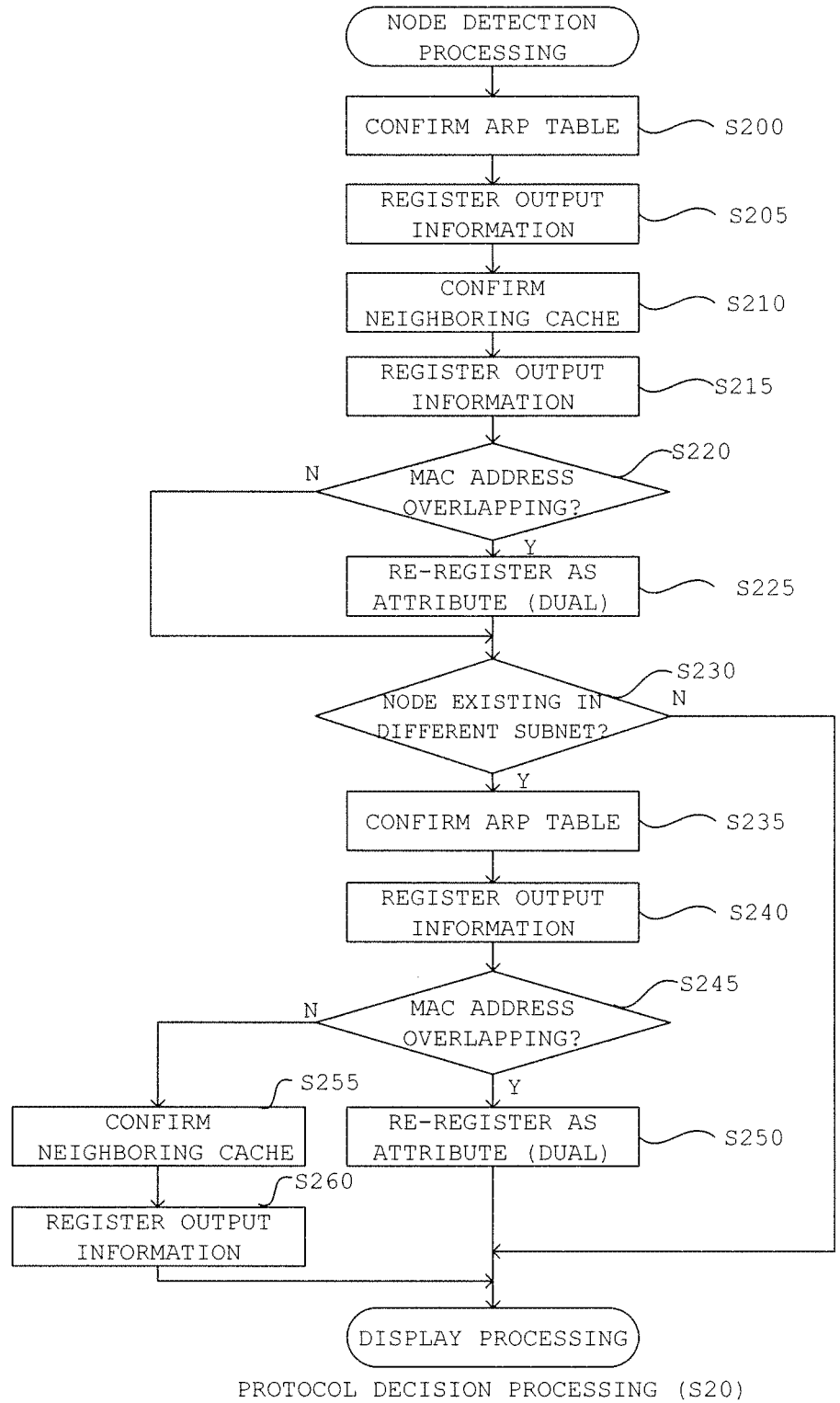
FIG. 10 is an explanatory flowchart of protocol decision processing (S20)

FIG. 10 is an explanatory flowchart of the protocol decision processing (S20).

As exemplified in FIG. 10, in step 200 (S200), the ARP table reference portion 522 executes the "arp-a" command to reference the ARP table of a subnet of interest. The ARP table reference portion 522 searches the referenced ARP table information for MAC addresses that correspond to the same IP addresses as those on which the operation is confirmed in the node detection processing (S10).

In step 205 (S205), the node registration portion 524 registers the IPv4 attributes and the MAC addresses identified by the ARP table reference portion 522, in the node DB700. Specifically, as exemplified in FIG. 11(A), the node registration portion 524 registers the IP addresses, the MAC addresses, and the attributes in the node DB700 in condition where they are correlated with the IP addresses registered in the node DB700.

In step 210 (S210), the neighboring cache reference portion 542 executes the "netsh interface ipv6 show neighbors" command to reference neighboring cache information of a link of interest. The neighboring cache reference portion 542 searches the referenced neighboring cache information for MAC addresses that correspond to the same IP addresses as those on which the operation is confirmed in the node detection processing (S10).

In step 215 (S215), the node registration portion 544 registers the IPv6 attributes and the MAC addresses identified by the neighboring cache reference portion 542, in the node DB700. Specifically, as exemplified in FIG. 11(B), the node registration portion 544 registers the IP addresses, the MAC addresses, and the attributes in the node DB700 in condition where they are correlated with the IP addresses on which the operation is confirmed in the node detection processing (S10).

In step 220 (S220), the MAC comparison portion 562 compares the MAC addresses contained in the node information of the IPv4 attributes and the MAC addresses contained in the node information of the IPv6 attributes registered in the node DB700 to each other to check whether there are overlapping MAC addresses. When any overlapping MAC address is confirmed, the protocol decision processing (S20) makes a shift to S125 processing. When no overlapping address exists, it makes a shift to S230 processing.

In step 225 (S225), the node integration portion 564 integrates the overlapping node information and updates the node DB700 by setting the attributes as a dual stack node.

In step 230 (S230), when any one of the nodes of the IPv4 attributes registered in the node DB700 by the first acquisition portion 520 exists outside the subnet of the node detection device 10, the protocol decision processing (S20) makes a shift to S235 processing. When no node exists outside the subnet, it makes a shift to the display processing (S30).

In step 235 (S235), the ARP table reference portion 522 executes the "arp-a" command on the next subnet to confirm the ARP table of the next subnet of interest. The ARP table reference portion 522 searches the referenced ARP table information for MAC addresses that correspond to the same IP addresses as those on which the operation is confirmed in the node detection processing (S10).

In step 240 (S240), the node registration portion 524 registers information of the IP addresses, the MAC addresses, and the IPv4 attributes identified by the ARP table reference portion 522 in S235, in the node DB700.

In step 245 (S245), The MAC comparison portion 562 compares the MAC addresses contained in the node information of the IPv4 attributes and the MAC addresses contained in the node information of the IPv6 attributes registered in the node DB700 to each other to check whether there are overlapping MAC addresses. When any overlapping MAC address is confirmed, the protocol decision processing (S20) makes a shift to S250 processing. When no overlapping address exists, it makes a shift to S255 processing.

In step 250 (S250), the node integration portion 564 integrates the overlapping node information and updates the node DB700 by setting the attributes as a dual stack node.

In step 255 (S255), since there is a possibility that there is a node of the IPv6 attributes in a different link, the neighboring cache reference portion 542 executes the "netsh interface ipv6 show neighbors" command to reference the neighboring cache information. The neighboring cache reference portion 542 searches the referenced neighboring cache information for MAC addresses that correspond to the same IP addresses as those on which the operation is confirmed in the node detection processing (S10).

In step 260 (S260), the node registration portion 544 registers information of the IP addresses, the MAC addresses, and the IPv6 attributes identified by the neighboring cache reference portion 544, in the node DB700.

The processing of S230 through S260 will be repeated until there is no subnet other than the node detection device 10 or no link other than the node detection device 10.

FIGS. 12(A) to 12(C) are examples of displaying node information identified by the protocol decision processing (S20).

As exemplified in FIG. 12(A), in the display processing (S30), the display portion 600 displays the node information identified in the protocol decision processing (S20). Specifically, the display portion 600 can display the number of the IPv4, IPv6, and dual stack nodes registered in the node DB700 via the interface generation portion 622. Moreover, as exemplified in FIG. 12(B), the display portion 600 can provide piecewise display for each network by acquiring subnet mask information.

Further, in the display processing (S30), as shown in FIG. 12(C), the recommendation portion 620 decides for each subnet whether shift to IPv6 is recommended on the basis of the protocol-compliant quantities decided in the protocol decision processing (S20) and a predetermined threshold value for each subnet, and in accordance with results of the decision by the recommendation portion 620, the display portion 600 can display information of the nodes for which shift to the IPv6-compliant node is recommended.

Figure 13B:
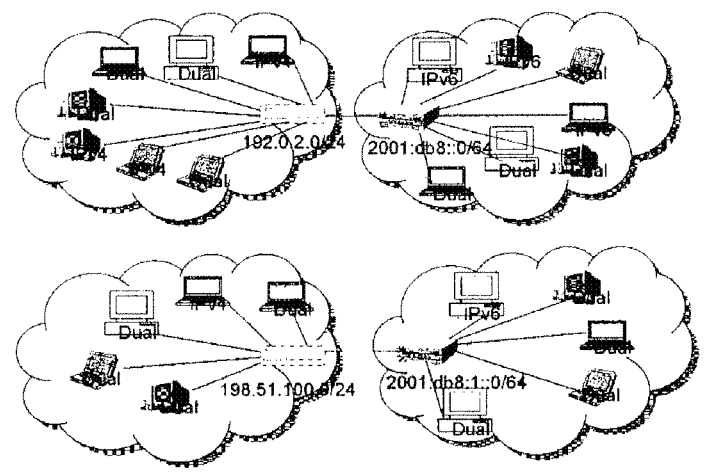
Figure 13C:
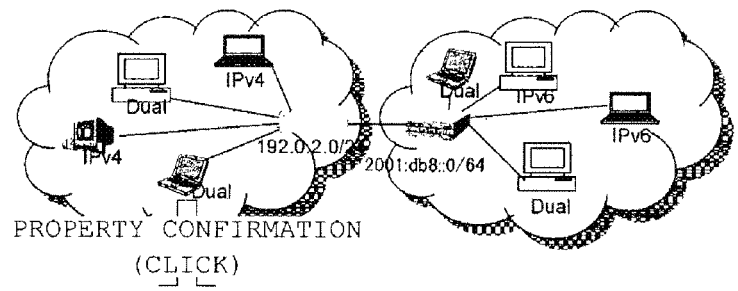

FIGS. 13(A) to 13(C) are examples of patterns in which the node information is displayed by the display portion 600.

As exemplified in FIG. 13(A), the node information identified by the protocol decision program 5 can be displayed in a table. Further, as shown in FIG. 13(B), tangible visualizing of the information is possible by use of icons. Moreover, as shown in FIG. 13(C), detailed information can also be displayed as the properties of an icon-indicated terminal.

As described hereinabove, the node detection device 10 of the present embodiment collects nodes registered in the DNS server 8 as candidate nodes, performs operation confirmation on the candidate nodes, and establishes the nodes existing in the network. Then, the protocol decision program 5 can identify whether the existing nodes comply with the IPv4 protocol, the IPv6 protocol, or both of those protocols (dual stack nodes) by using the MAC address as a key. It makes it possible to create a network block diagram of the nodes existing in the network and concretize the network configuration. Moreover, it is possible to easily manage the services that correspond to the IPv4 and IPv6 protocols and, further, grasp a situation that deals with the shift to the IPv6 protocol.

Next, a description will be given of a variant of the above embodiment.

Although, in the above embodiment, the node detection processing (S10) is performed prior to protocol decision on the nodes, this processing is not indispensable; for example, the node detection device 10 may update the ARP table or the neighboring cache by performing broadcasting to a subnet of interest.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A node detection system, wherein a protocol decision program is installed, comprising:
   first acquisition section that acquires identification information peculiar to a communication device in accordance with a first communication protocol;
   a second acquisition section that acquires the identification information peculiar to the communication device in accordance with a second communication protocol; and
   an identification section that identifies the communication device that complies with both of the first communication protocol and the second communication protocol based on the identification information acquired by the first acquisition section and the identification information acquired by the second acquisition section wherein:
   the first acquisition section acquires an MAC address of the communication device in accordance with an IPv4 protocol;
   the second acquisition section acquires the MAC address of the communication device in accordance with an IPv6 protocol;
   wherein the first acquisition section acquires the MAC address of the communication device from an ARP table;
   the second acquisition section acquires the MAC address of the communication device from a neighboring cache;
   the identification section identifies the communication device that complies with both of the IPv4 protocol and the IPv6 protocol based on the MAC address acquired by the first acquisition section and the MAC address acquired by the second acquisition section;

a DNS acquisition section that acquires an address of the communication device which is managed by a DNS server;

an operation confirmation section that confirms operation of the communication device based on the address acquired by the DNS acquisition section; and a node registration section that registers the communication device having the address acquired by an acquisition section as an operating node, based on a result of the operation confirmation by the operation confirmation section, wherein:

after the operation of a predetermined subnet are confirmed by the operation confirmation section, the first acquisition section acquires the MAC address of the communication device from the ARP table of this subnet; and after the operation of the predetermined subnet are confirmed by the operation confirmation section, the second acquisition section acquires the MAC address of the communication device from the neighboring cache of this subnet.

2. A node detection system, wherein a protocol decision program is installed, comprising:

a first acquisition section that acquires identification information peculiar to a communication device in accordance with a first communication protocol;

a second acquisition section that acquires the identification information peculiar to the communication device in accordance with a second communication protocol; and an identification section that identifies the communication device that complies with both of the first communication protocol and the second communication protocol based on the identification information acquired by the first acquisition section and the identification information acquired by the second acquisition section:

a quantity identification section that identifies a number of the communication devices that comply with both of the first communication protocol and the second communication protocol, a number of the communication devices that comply with the first communication protocol but do not comply with the second communication protocol, and a number of the communication devices that comply with the second communication protocol but do not comply with the first communication protocol based on a result of the identification by the identification section, the identification information acquired by the first acquisition section, and the identification information acquired by the second acquisition section, wherein the quantity identification section identifies the number of the communication devices that comply with both of the first communication protocol and the second communication protocol, the number of the communication devices that comply with the first communication protocol but do not comply with the second communication protocol, and the number of the communication devices that comply with the second communication protocol but do not comply with the first communication protocol for each subnet;

and a recommendation section that recommends to cause the communication devices which comply with the first communication protocol but do not comply with the second communication protocol to comply with the second communication protocol based on the numbers of the devices for each of the subnets that are identified by the quantity identification section.

\* \* \* \* \*